(12) United States Patent
Shimoda et al.

(10) Patent No.: US 11,294,354 B2
(45) Date of Patent: Apr. 5, 2022

(54) SERVO CONTROLLER

(71) Applicant: FANUC CORPORATION, Yamanashi (JP)

(72) Inventors: Takaki Shimoda, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 153 days.

(21) Appl. No.: 16/923,659

(22) Filed: Jul. 8, 2020

(65) Prior Publication Data

US 2021/0018900 A1    Jan. 21, 2021

(30) Foreign Application Priority Data

Jul. 19, 2019 (JP) .............................. JP2019-133481

(51) Int. Cl.
| | |
|---|---|
| G05B 19/4155 | (2006.01) |
| G05B 19/404 | (2006.01) |
| G05B 19/41 | (2006.01) |
| G05B 19/4103 | (2006.01) |
| G05B 19/416 | (2006.01) |

(52) U.S. Cl.
CPC ....... *G05B 19/4155* (2013.01); *G05B 19/404* (2013.01); *G05B 19/41* (2013.01); *G05B 19/4103* (2013.01); *G05B 19/416* (2013.01); *G05B 2219/34013* (2013.01)

(58) Field of Classification Search
None
See application file for complete search history.

(56) References Cited

U.S. PATENT DOCUMENTS

| | | | |
|---|---|---|---|
| 2019/0227502 A1* | 7/2019 | Nakamura | G05B 13/0265 |
| 2020/0408631 A1* | 12/2020 | Shinoda | G01C 25/005 |
| 2021/0008678 A1* | 1/2021 | Tsuneki | G05B 19/234 |

FOREIGN PATENT DOCUMENTS

| | | |
|---|---|---|
| JP | 4565034 B2 | 10/2010 |
| JP | 2018151736 A | 9/2018 |

* cited by examiner

*Primary Examiner* — Ryan A Jarrett
(74) *Attorney, Agent, or Firm* — Studebaker & Brackett PC

(57) ABSTRACT

An object is to provide a servo controller which constantly optimizes parameters according to the state of a machine. A servo controller for controlling an electric motor which drives the axis of an industrial machine includes: a state value derivation unit which derives, from an operation program and/or operation plan information of the industrial machine, the chronological or event-sequential data of the state value of the electric motor or a driven member that is operated with the electric motor; and a parameter change unit which changes at least one parameter of a velocity gain, a position gain, a feedforward gain, a filter frequency and an acceleration/deceleration time constant after interpolation based on the chronological or event-sequential data derived in the state value derivation unit either chronologically or event-sequentially.

3 Claims, 5 Drawing Sheets

SERVO CONTROLLER

This application is based on and claims the benefit of priority from Japanese Patent Application No. 2019-133481, filed on 19 Jul. 2019, the content of which is incorporated herein by reference.

BACKGROUND OF THE INVENTION

Field of the Invention

The present invention relates to servo controllers.

Related Art

As is known, in the field of machine work, CNC (Computerized Numerical Control) technology is applied, the amount of movement, the velocity of the movement and the like are numerically controlled with a computer and thus the repetition of the same operation, a complicated operation and the like are highly automated.

Design and drafting are performed with a CAD (Computer Aided Design), an operation program (such as a machining program) corresponding to CAD data is produced with a CAM (Computer Aided Manufacturing), data produced with the CAM is taken into a CNC, for example, various types of data such as options, parameters, an NC program, a macro program, a macro variable, a work origin offset, a tool offset, tool shape data and tool management data are input and control is performed, with the result that an NC machine tool such as an NC lathe and a machining center or the like is automated from design through manufacturing.

On the other hand, in a servo motor (electric motor) for driving an axis or the like of an industrial machine such as a machine tool or a robot, the amount of rotation, the velocity, the torque thereof and the like are controlled for driving.

Here, Patent Document 1 discloses a "controller for an electric motor that includes: a means which adds a sinusoidal command to a torque command for the electric motor; a means which acquires a current value flowing through the electric motor; a means which acquires an acceleration value for the electric motor; and a means which estimates the inertia of a driven member by the electric motor from a typical current value and a typical acceleration value obtained from a plurality of the current values and a plurality of the acceleration values over a plurality of periods of the sinusoidal command in the same operation state and a torque constant for the electric motor".

Patent Document 2 discloses a "numerical controller which is connected to a shared database, which controls a machine tool, in which the shared database stores machining resource information related to the numerical controller and the machine tool, machining content information that is produced with a CAD and a CAM and that is related to the contents of machining and machining command information that includes machining request information on at least one request for the machining, which includes a machining command decoding unit that decodes the machining command information and a machining command execution unit that executes the machining based on the result of the decoding by the machining command decoding unit and in which the machining command decoding unit executes at least one of processing that determines, based on the machining command information and the machining resource information stored in the shared database, whether or not the machining can be performed with the machining command information in the machine tool, processing that determines parameters for the machining and processing that automatically selects functions of the numerical controller and the machine tool used for the machining".

Patent Document 1: Japanese Patent No. 4565034
Patent Document 2: Japanese Unexamined Patent Application, Publication No. 2018-151736

SUMMARY OF THE INVENTION

For example, in a machine tool, when inertia and the state of a machine position (state value) are changed by a machine operation such as machining, optimal parameters such as gains (for example, a position gain and a velocity gain) and a filter band are also changed. In general, since parameters are fixed, the most conservative settings are made so as to correspond to variations in a machine. Specifically, in order to reduce the occurrence of oscillation caused by a machine operation such as machining, settings are previously made such that low gains, a filter with large attenuation (large delay) and a long time constant are provided. In this way, it is difficult to reduce a cycle time. Alternatively, in a case where parameters are set so as to be optimal under certain conditions, when inertia and a position are changed, the parameters are not optimal, and thus vibration is likely to occur at the time of machining in a machine tool, with the result that, for example, a scratch may be produced in the surface of the machining.

Since fixed parameters are disadvantageous in variations as described above, a method of optimizing parameters so as to correspond to the state of a machine or the like is highly desired.

As a method of optimizing parameters so as to correspond to a state, (1) a method of adaptively changing parameters and (2) a method of changing parameters systematically in advance can be considered. Of the methods described above, in the method of adaptively changing parameters, it is necessary to estimate the state and calculate optimal values in real time, and thus problems are present in which (A) a calculation load is increased (=an expensive computation device is needed), in which (B) since estimation calculation uses FB data obtained in real time from sensors, an influence of noise is received and in which (C) it is difficult adjust hyper parameters used for the estimation calculation itself.

In (2) the case of changing parameters systematically in advance, only information within a CNC (numerical controller) is often not sufficient enough to produce an optimal parameter schedule.

A servo controller according to an aspect of the present disclosure is a servo controller for controlling an electric motor which drives the axis of an industrial machine, and includes: a state value derivation unit which derives, from an operation program and/or operation plan information of the industrial machine, the chronological or event-sequential data of the state value of the electric motor or a driven member that is operated with the electric motor; and a parameter change unit which changes at least one parameter of a velocity gain, a position gain, a feedforward gain, a filter frequency and an acceleration/deceleration time constant after interpolation based on the chronological or event-sequential data derived in the state value derivation unit either chronologically or event-sequentially.

In the servo controller according to the aspect of the present disclosure, based on the event-sequential or chronological data of a machine which is predicted, the event-sequential or chronological schedule of the optimal parameter is determined, the parameter is changed according to the schedule and thus it is possible to optimize the parameter according to the state of the machine such as a driven members, an axis and the like. In this way, it is possible to enhance the accuracy of operation of the industrial machine such as enhancing the accuracy of machining of a machine tool and to perform time reduction (enhance yields).

DETAILED DESCRIPTION OF THE INVENTION

A servo controller according to an embodiment will be described below with reference to FIGS. 1 to 7.

In the present embodiment, a description will first be given with the assumption that an industrial machine is a machine tool and that an electric motor is a servo motor which drives the spindle (axis, driven member) or the like of the machine tool. However, the industrial machine according to the present invention may be naturally another industrial machine such as a robot, a transport device, a measurement device, a test device, a press machine, a press-fitting device, a printing machine, a die casting machine, an injection molding machine, a food machine, a packaging machine, a welding machine, a washing machine, a coating machine, an assembly device, a mounter, a woodworking machine, a sealing device or a cutting machine.

Figure 1:
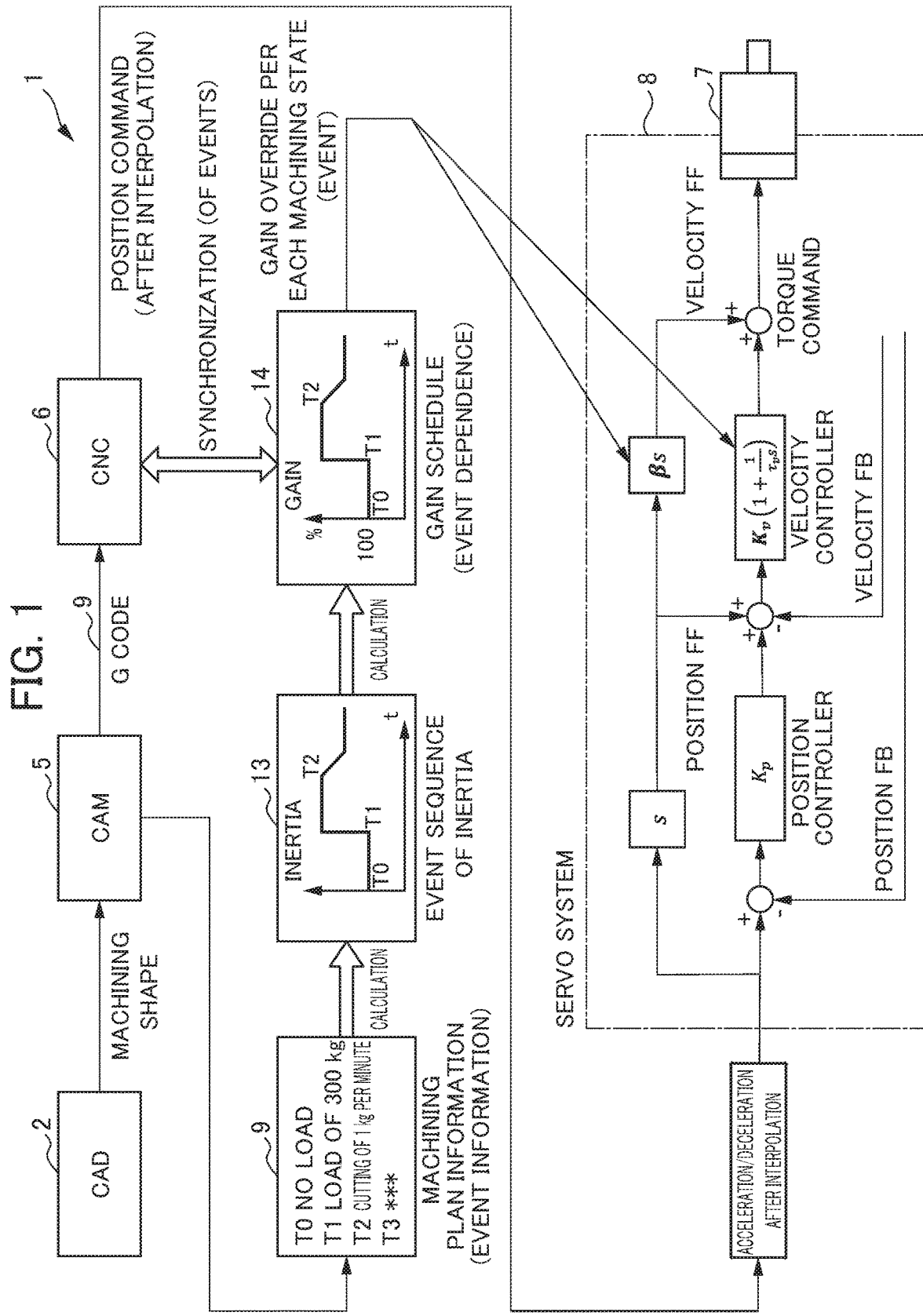
FIG. 1 is a diagram showing a control system and a servo controller of a machine tool in a first aspect.
Figure 2:
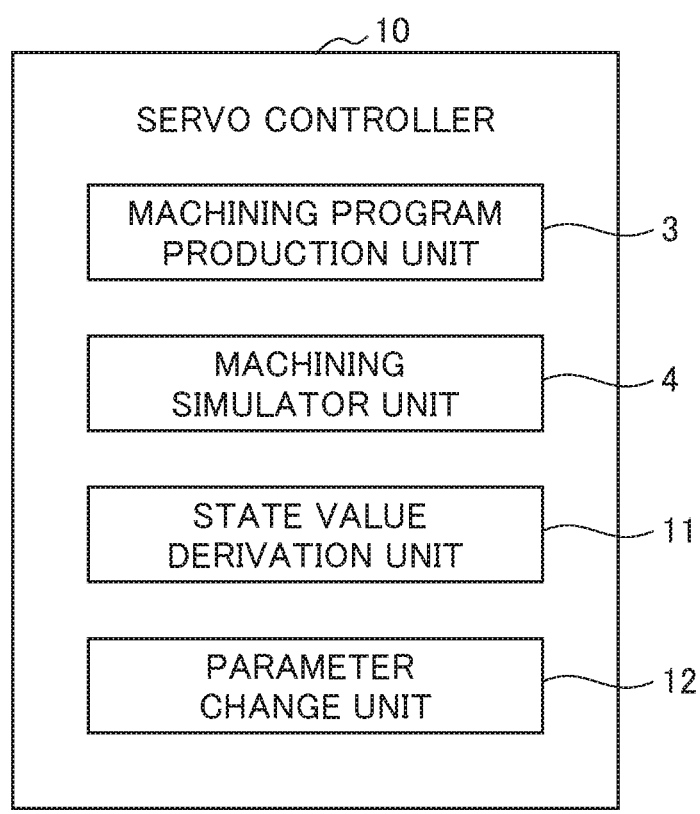
FIG. 2 is a block diagram showing the servo controller in the aspect.

As shown in FIGS. 1 and 2, the control system 1 of the machine tool of the present embodiment first includes: a CAD 2 for performing design, drafting and the like of a product; a machining program production unit (operation program production unit) 3 which produces a machining program (operation program) from machining shape data (product data) produced with the CAD 2; a CAM 5 which includes a machining simulator unit (operation simulator unit) 4 that performs machining simulation (operation simulation); a CNC 6 of a command unit which issues a command signal based on machining plan information (G code, operation plan information) 9 that is fed from the CAM 5; and a motor control unit 8 which controls the drive of the servo motor (drive unit) 7 of the machine tool based on the command of the CNC 6.

The servo motor 7 of the drive unit is, for example, a servo motor (electric motor) for driving a spindle (axis) to which a feed axis (axis) for moving a table (driven member) that holds a workpiece (driven member), a tool (driven member) or the like is fitted or the like, and the motor control unit 8 is, for example, a servo amplifier.

On the other hand, the servo controller 10 of the present embodiment includes: the machining program production unit 3 described above; the machining simulator unit 4; a state value derivation unit 11 which acquires the machining plan information produced in the machining program production unit 3 and the machining simulator unit 4 so as to determine, from the machining plan information, chronological or event-sequential data of state values of the driven members such as the workpiece and the table and the servo motor 7; and a parameter change unit 12 which changes at least one parameter of a velocity gain, a position gain, a feedforward gain, a filter frequency and an acceleration/deceleration time constant after interpolation based on the chronological or event-sequential data derived in the state value derivation unit 11 either chronologically or event-sequentially.

Specifically, as shown in FIG. 1, the machining plan information 9 produced in the CAD 2 and the CAM 5 is acquired in the CNC 6, thereafter the CNC 6 of the command unit issues a position command and an acceleration/deceleration command after interpolation to the motor control unit 8 of the servo amplifier and thus the drive of the servo motor 7 is controlled with the motor control unit 8.

Here, in the servo controller 10 of the present embodiment, the state value derivation unit 11 acquires the machining plan information 9 from the CAM 5, and determines a relationship 13 of chronology or event sequence of inertia from the machining plan information 9. The event sequence of inertia indicates a time necessary for each machining step (event) continuously and chronologically, and means, for example, the chronology of inertia which reflects, for example, a case where between a certain machining step and the subsequent machining step, a time regardless of the steps is produced such as by a contingency.

An example will be more specifically described.

Figure 3:
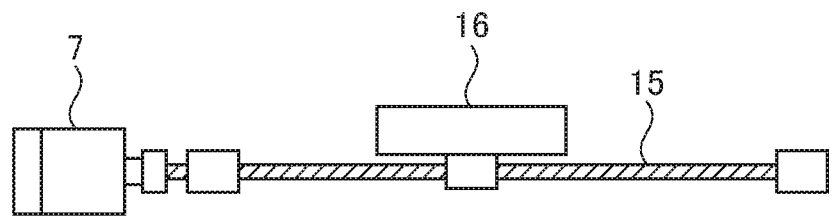
FIG. 3 is a diagram used for illustrating the production of the event-sequential or chronological schedule of the optimal parameter with the servo controller in the aspect.

As shown in FIG. 3, in a state where the workpiece is not held (placed) on a stage (table) 6 which is moved by the forward/reverse rotation of a feed axis (ball screw) 15 around an axis line by the drive of the servo motor 7, inertia $J=J_0$. $J_0$ is the total of inertia values of the rotor of the motor, the feed axis 15 and the stage 16.

Figure 4:
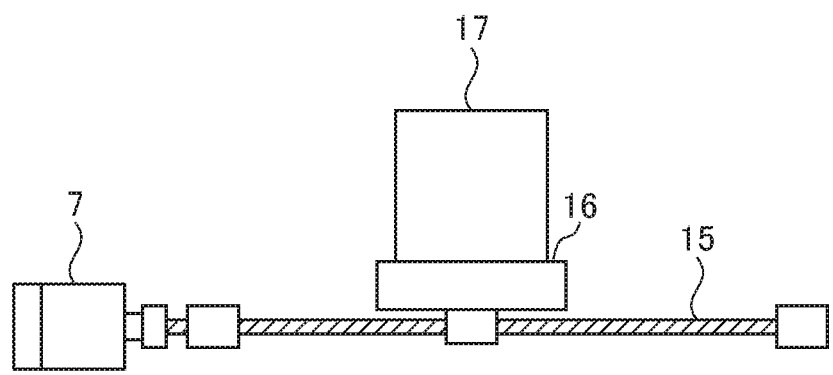
FIG. 4 is a diagram used for illustrating the production of the event-sequential or chronological schedule of the optimal parameter with the servo controller in the aspect.

As shown in FIG. 4, when the workpiece 17 of mass M is held on the stage 6, inertia $J_{LOAD}=J_0+MR^2$. R is a conversion coefficient of rotation-linear motion for a lead (movement distance) L (m), and $R=L/2\pi$ (m/rad).

In this way, a velocity FB gain and a velocity FF gain are scheduled to be $J_{LOAD}/J=1+(MR^2/J_0)$ times. For example, when $J_0=0.01$ kgm$^2$, M=500 kg and L=0.02 m, the gain is set to be 1.5 times $J_{LOAD}/J=1+(MR^2/J_0)$.

Figure 5:
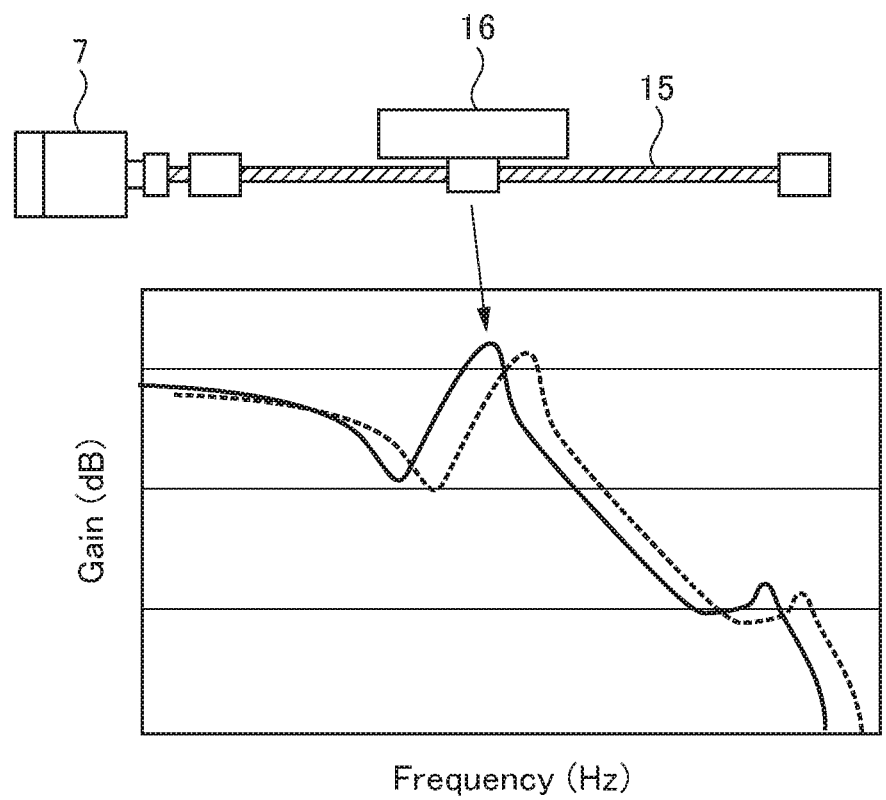
FIG. 5 is a diagram used for illustrating the production of the event-sequential or chronological schedule of the optimal parameter with the servo controller in the aspect.
Figure 6:
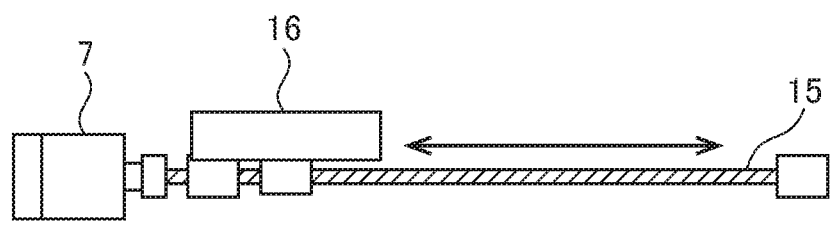
FIG. 6 is a diagram used for illustrating the production of the event-sequential or chronological schedule of the optimal parameter with the servo controller in the aspect.

On the other hand, when a transmission characteristic from the torque of the servo motor 7 to the position (machine end) of the stage 16 is illustrated, the transmission characteristic is, for example, as shown in FIG. 5. When as shown in FIG. 6, the position of the stage 16 is changed, the rigidity Kt of the machine in an axial direction is changed, and thus a resonance frequency (natural frequency) is also changed. In particular, in the case of a large machine or a long ball screw (such as a stroke), the rigidity is significantly changed according to the position thereof.

Figure 7:
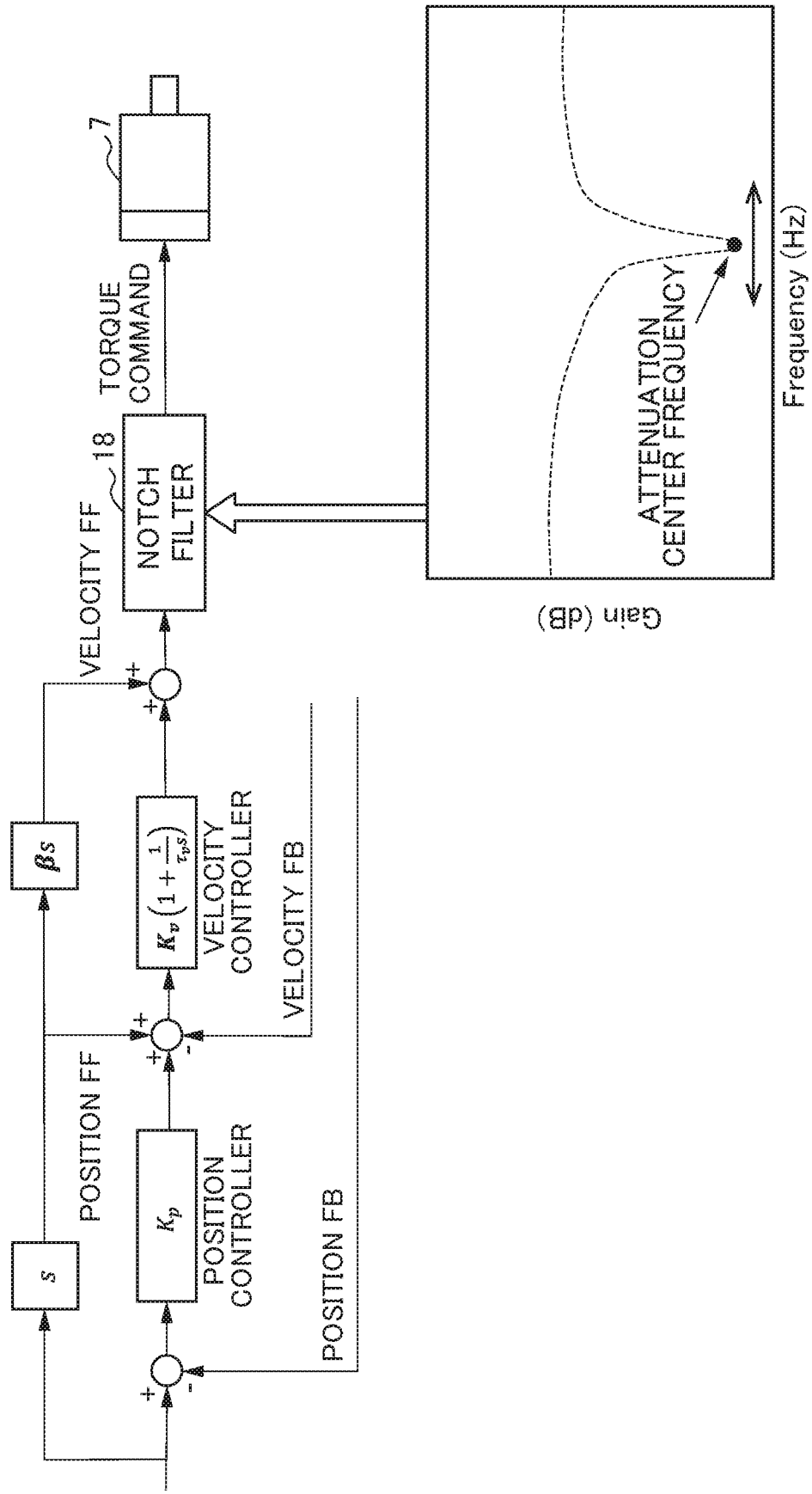
FIG. 7 is a diagram used for illustrating the production of the event-sequential or chronological schedule of the optimal parameter with the servo controller in the aspect.

Hence, as shown in FIG. 7, the attenuation center frequency (resulting from the change of the resonance frequency) of a filter 18, a time constant (since vibration is likely to occur when the rigidity is lowered, the time constant is increased) and the like are scheduled so as to correspond to the position.

Then, as shown in FIG. 1, the state value derivation unit 11 acquires the machining plan information 9 from the CAM 5 so as to determine the relationship 13 of chronology or event sequence of inertia from the machining plan information 9, and thereafter the state value derivation unit 11 determines a gain schedule (the velocity gain, the position gain, the feedforward gain and the like which are chronological) 14 from the relationship 13 of chronology or event sequence of inertia so as to synchronize the gain schedule and the command of the CNC 6.

Then, the parameter change unit 12 changes the parameter of the velocity loop (and/or the position loop) of the motor control unit 8 based on the gain schedule (chronological or event-sequential data) 14 derived in the state value derivation unit 11 either chronologically or event-sequentially. For example, as shown in FIG. 1, the parameters "R (coefficient)" and "Kv (gain)" of the velocity loop are changed so as to correspond to the gain schedule. Here, "s" in the velocity loop or the position loop of FIG. 1 is a derivative value.

Then, based on the velocity FF (or the position FF: feedforward) which is changed so as to correspond to the gain schedule, the command such as the torque command is issued from the motor control unit 8, and thus the servo motor 7 is controlled for driving.

In this way, in the servo controller 10 of the present embodiment, based on the event-sequential or chronological data of the machine which is predicted, the event-sequential or chronological schedule 14 of the optimal parameter as described above is determined, the parameter is changed according to the schedule 14 and thus it is possible to constantly optimize the parameter according to the state of the machine such as the driven members, the axis and the like. It is not necessary to perform control with the FB.

Hence, in the servo controller 10 of the present embodiment, it is possible to enhance the accuracy of machining of the machine tool (enhance the accuracy of operation of the industrial machine) and to perform time reduction (enhance yields).

Here, preferably, the state value derivation unit 11 derives the chronological or event-sequential data of inertia of the driven member or derives the chronological or event-sequential data of the position of the axis of the machine tool or the like. Although in FIG. 1, the parameters "β (coefficient)" and "Kv (gain)" of the velocity loop (velocity gain) are changed so as to correspond to the gain schedule, the parameter of the position loop (position gain) may be changed, and the parameters of the feedforward gain, the filter frequency and the acceleration/deceleration time constant after interpolation may be changed based on the result of the derivation of the state value derivation unit 11. When the chronological or event-sequential data of inertia of the driven member is derived, a schedule for changing the velocity gain of the parameter can be produced whereas when the chronological or event-sequential data of the position of the axis is derived, a schedule for changing the filter frequency and the time constant can be produced. Then, even in the cases described above, it is possible to obtain the same operational effects as described above.

Although the embodiment of the servo controller has been described above, the present invention is not limited to the embodiment described above, and can be changed as necessary without departing from the spirit thereof.

EXPLANATION OF REFERENCE NUMERALS

1: control system of machine tool (industrial machine)
2: CAD
3: machining program production unit (operation program production unit)
4: machining simulator unit (operation simulator unit)
5: CAM
6: CNC
7: servo motor (drive unit)
8: motor control unit
9: machining plan information (operation plan information)
10: servo controller
11: state value derivation unit
12: parameter change unit

What is claimed is:

1. A servo controller for controlling an electric motor which drives an axis of an industrial machine, the servo controller comprising:
   a state value derivation unit which derives, from an operation program and/or operation plan information of the industrial machine, chronological or event-sequential data of a state value of the electric motor or a driven member that is operated with the electric motor; and
   a parameter change unit which changes at least one parameter of a velocity gain, a position gain, a feedforward gain, a filter frequency and an acceleration/deceleration time constant after interpolation based on the chronological or event-sequential data derived in the state value derivation unit either chronologically or event-sequentially.

2. The servo controller according to claim 1, wherein the state value derivation unit derives the chronological or event-sequential data of inertia of the driven member.

3. The servo controller according to claim 1, wherein the state value derivation unit derives the chronological or event-sequential data of a position of the axis.

* * * * *